United States Patent [19]
Pinnavaia et al.

[11] Patent Number: 5,760,106
[45] Date of Patent: Jun. 2, 1998

[54] SEALANT METHOD OF EPOXY RESIN-CLAY COMPOSITES

[75] Inventors: Thomas J. Pinnavaia; Tie Lan, both of East Lansing, Mich.

[73] Assignee: Board of Trustees operating Michigan State University, East Lansing, Mich.

[21] Appl. No.: 713,920

[22] Filed: Sep. 13, 1996

Related U.S. Application Data

[62] Division of Ser. No. 498,350, Jul. 5, 1995.

[51] Int. Cl.$^6$ .............................. C08K 3/34; C08K 9/04; C08L 3/00
[52] U.S. Cl. ..................... 523/209; 523/216; 523/443
[58] Field of Search ................................. 523/209, 216, 523/443

[56] References Cited

U.S. PATENT DOCUMENTS

| | | | |
|---|---|---|---|
| 3,432,370 | 3/1969 | Bash et al. | |
| 3,511,725 | 5/1970 | Stevens et al. | |
| 3,847,726 | 11/1974 | Becker et al. | |
| 4,683,259 | 7/1987 | Goodman | 524/447 |
| 4,889,885 | 12/1989 | Usuki et al. | |
| 5,108,832 | 4/1992 | Nugent, Jr. et al. | 428/304.4 |
| 5,554,670 | 9/1996 | Giannelis et al. | 523/209 |

FOREIGN PATENT DOCUMENTS

| | | |
|---|---|---|
| 1004859 | 2/1977 | Canada . |
| 9304117 | 4/1993 | WIPO . |
| 9304118 | 4/1993 | WIPO . |

OTHER PUBLICATIONS

Giannelis, E.P. Jom 44 28 (1992).
Gleiter, H. Adv. Mater. 4 474 (1992).
Novak, B. M., Adv. Mater. 5 422 (1993).
Pinnavaia, T.J., Science 220 365 (1983).
Kato, C., et al., Clays Clay Miner. 27 129 (1979).
Sugahara, Y., et al., J. Ceram. Soc. JPN. 100 413 (1992).
Vaia, R.A., et al., Chem. Mater. 5 1694 (1993).
Messersmith, P.B., et al., Chem. Mater. 5 1064 (1993).
Fukushima, Y., et al., J. Inclusion Phenom. 5 473 (1987).
Fukushima, Y., et al., Clay Miner 23 27 (1988).
Usuki, A., et al., J. Mater. Res. 8 1174 (1993).
Usuki, A., et al., J. Mater. Res. 8 1179 (1993).
Kojima, Y., et al, J. Mater. Res. Res. 8 1185 (1993).
Kirk–Othmer, John Wiley & sons 9 267–290 (1980).
Kamon, T., et al., In Epoxy Resins and Composites IV, Dusek, K., Ed. Springer–Verlag: Berlin: Advances in Polymer Science, 80 177 (1986).
Barton, J. M., Advances in Polymer Science 72 120 (1985).
May, C.A., Ed. Epoxy Resins, 2nd ed: Marcel Dekker: New York (1988) pp. 285–309.
Lan, et al., Proceedings of the ACS, PMSE 71 527–528 (published Aug. 1994).
Lan et al., Chemistry of Materials 6 2216–2219 (Dec. 1994).
Messersmith et al., Chemical Materials 6 1719–1725 (Dec. 1994).

*Primary Examiner*—Donald R. Wilson
*Attorney, Agent, or Firm*—Ian C. McLeod

[57] ABSTRACT

A clay-resin composition of a cured epoxy resin and a layered clay with the cured epoxy resin in the galleries of the clay by intercalation or exfoliation. The preferred epoxy resins are flexible and usually elastic because of the epoxy resin and/or curing agent which is used. The result is a composite which can have superior tensile strength and/or solvent resistance as compared to the cured epoxy resin without the clay or with the clay but without the intercalation or exfoliation. The flexible composites are particularly useful for seals and other thin layer applications.

13 Claims, 6 Drawing Sheets

Intercalated Clay–Polymer Nanocomposites ($h_0 \leq h_e$).

Exfoliated Clay–Polymer Nanocomposites ($h_0 > h_e$).

Glassy Matrix

Rubbery Matrix

Increasing Strain

SEALANT METHOD OF EPOXY RESIN-CLAY COMPOSITES

This is a divisional of copending application Ser. No. 08/498,350 filed on Jul. 5, 1995.

GOVERNMENT RIGHTS

The invention described in this application was sponsored by the National Science Foundation Contract CHE-92241023. The U.S. Government has certain rights to this invention.

BACKGROUND OF THE INVENTION

(1) Field of the Invention

The present invention relates to novel flexible clay-resin composite compositions containing a cured epoxy resin and to a method for their preparation. In particular, the present invention relates to the cured epoxy resin and clay composite containing the cured epoxy resin in the galleries of the clay, such that the clay is intercalated or exfoliated. The composites are flexible and usually elastic.

(2) Description of Related Art

Layered or smectite clays are natural or synthetic layered oxides such as bentonite, montmorillonite, hectorite, fluorohectorite, saponite, beidellite, nontronite, and related analogs. The layers are made up of a central octahedral sheet, usually occupied by aluminum or magnesium, sandwiched between two sheets of tetrahedral silicon sites. These negatively charged layers are approximately 10 Å thick, and are separated by hydrated cations such as alkali or alkaline earth metal ions.

Hybrid organic-inorganic composites can exhibit mechanical properties superior to those of their separate components. To optimize the performance properties of these materials, it is usually desirable to disperse the inorganic components in the organic matrix on a nanometer length scale (Giannelis, E. P. JOM 44 28 (1992); Gleiter, H. Adv. Mater. 4 474 (1992); and Novak, B. M., Adv. Mater. 5 422 (1993)). Smectite clays and other layered inorganic materials that can be broken down into nanoscale building blocks (Pinnavaia, T. J., Science 220 365 (1983)) are useful for the preparation of organic-inorganic nanocomposites.

In general, the polymer-clay composites can be divided into three categories: conventional composites, intercalated nanocomposites, and exfoliated nanocomposites. In a conventional composite, the clay tactoids exist in their original state of aggregated layers with no intercalation of the polymer matrix between the layers of the clay. In an intercalated nanocomposite the insertion of polymer into the clay layer structure occurs in a crystallographically regular fashion, regardless of the clay-to-polymer ratio. An intercalated nanocomposite normally is interlayered by only a few molecular layers of polymer and the properties of the composite typically resemble those of the ceramic host (Kato, C., et al., Clays Clay Miner. 27 129 (1979); Sugahara, Y., et al., J. Ceram. Soc. Jpn. 100 413 (1992); Vaia, R. A., et al., Chem. Mater. 5 1694 (1993); and Messersmith, P. B., et al., Chem. Mater. 5 1064 (1993)). In contrast, in an exfoliated nanocomposite, the individual 10-Å-thick clay layers are separated in a continuous polymer matrix by average distances that depend on loading. Usually, the clay content of an exfoliated clay composite is much lower than that of an intercalated nanocomposite. Consequently, an exfoliated nanocomposite has a monolithic structure with properties related primarily to those of the starting polymer.

The exfoliation of smectite clays provides 10- Å-thick silicate layers with high in-plane bond strength and aspect ratios comparable to those found for fiber-reinforced polymer composites. Exfoliated clay nanocomposites formed between organocation exchanged montmorillonites and thermoplastic nylon-6 have recently been described (Fukushima, Y., et al., J. Inclusion Phenom. 5 473 (1987); Fukushima, Y., et al., Clay Miner. 23 27 (1988); and Usuki, A., et al., J. Mater. Res. 8 1174 (1993); and WO 93/04117 and 93/04118 describing thermoplastic polymers). Clay exfoliation in the nylon-6 matrix gave rise to greatly improved mechanical, thermal, and rheological properties, making possible new materials applications of this polymer (Usuki, A., et al., J. Mater. Res. 8 1179 (1993); and Kojima, Y., et al., J. Mater. Res. 8 1185 (1993)).

The clays used for nanocomposite formation are ion-exchanged forms of smectite clays in which the $Na^+$ and/or $Ca^{2+}$ gallery cations of the pristine mineral have been replaced by organic onium ions. The onium ions may be protonated primary amines ($RNH_3^+$), secondary amines ($R_2NH_2^+$), or they may be tertiary amines ($R_3NH^+$) or quaternary ammonium ions ($R_4N$)$^+$. The alkyl groups attached to nitrogen may be the same or different, and the alkyl groups may be replaced in part by a benzyl group ($—CH_2—C_6H_5$), a phenyl group ($—C_6H_5$) or by benzyl and phenyl groups. The alkyl groups may also be functionalized, as protonated $\alpha$, $\omega$-amino acid with the general formula $(H_3N—(CH_2)—COOH)^+$. Phosphonium ions may be used in place of ammonium ions for the formation of clay polymer nanocomposites.

In some polymer-clay composite systems it is possible to continuously vary the amount of intercalated polymer between the clay layers from one or a few monolayers of polymer chains to multiple layers of polymer. In such cases it is possible to prepare composites with properties that vary from those typical of an "intercalated clay" nanocomposite to those typical of an "exfoliated clay" nanocomposite. The intercalated and exfoliated states of the clay may be distinguished based on the ratio of the observed gallery height ($h_o$) to the gallery height expected for a lipid-like bilayer of onium ions in the gallery ($h_e$). The value of $h_e$ can be easily computer based on the van der Waals length of the onium ion (l). Thus, $h_e$=21. The observed gallery height ($h_o$) can be determined by subtracting the thickness of a smectite clay (9.6 Å) from the basal spacing obtained by X-ray diffraction measurement ($d_{001}$). As illustrated in FIGS. 1A to 1D, if $h_o \leq h_e$, then the spacing between the clay layers allows for van der Waals interactions between the onium ions on adjacent layers. These van der Waals interactions between onium ion chains link adjacent clay layers. Under these conditions, the intercalated polymer (polym.) resides in the gallery space between the associated onium ions. The polymer-clay composites in these cases can be regarded as an intercalated clay composite. However, if $h_o > h_e$, as in FIG. 1E, then the adjacent layers of the clay are no longer linked through the onium ion interactions. However, the onium ion chains can reorient in the gallery to accommodate interaction of the polymer. Thus, as illustrated in the example in FIGS. 1A to 1E as the amount of intercalated polymer is increased the initial lateral bilayer structure of the organoclay in FIG. 1A has re-oriented to a paraffin structure in FIG. 1B and to a perpendicular bilayer in FIG. 1C, a lipid-like structure in FIG. 1D, and finally to an exfoliated structure in FIG. 1E. Consequently, the resulting state of the clay is best described as being exfoliated and the composite is an exfoliated polymer-clay composite. FIG. 1 illustrates these differences between intercalated and exfoliated polymer-clay composites in a system where the amount of interlayer polymer is varied continuously from one to multiple layers of polymer chains.

According to the teachings of Lagaly, the onium ions in an organo clay can adopt various orientations depending on the clay layer charge density and the chain length of the onium ions. The observed orientation of onium ions in smectite clays include lateral monolayers, lateral bilayers, pseudotrimolecular layers, paraffin-like layers and lipid-like bilayers.

U.S. Pat. No. 4,889,885 to Usuki et al shows thermoplastic vinyl polymer composites containing clay.

U.S. Pat. Nos. 3,432,370 to Bash et al; 3,511,725 to Stevens et al, 3,847,726 to Becker et al and Canadian Patent No. 1,004,859 to Nelson show various compositions incorporating flexible epoxy resins. There are numerous uses for these polymer matrices.

The problem has been to provide intercalated or exfoliated clay cured thermoset epoxy-resin composites. In general, it is difficult to obtain epoxy resins which are between the layers of the clay on a nanometer scale.

Epoxy resins tend to swell in the presence of organic solvents. This problem is not corrected by merely mixing a clay into the epoxy resin.

OBJECTS

It is therefore an object of the present invention to provide a cured resin composition of a clay intercalated or exfoliated with a cured thermoset epoxy resin. Further, it is an object of the present invention to provide preferred flexible and elastic cured thermoset epoxy resin-clay compositions with unique strength and solvent resistance properties. Further, it is an object of the present invention to provide composites which are relatively easy and economical to prepare. These and other objects will become increasingly apparent by reference to the following description and the drawings.

DESCRIPTION OF PREFERRED EMBODIMENTS

Figure 1A:
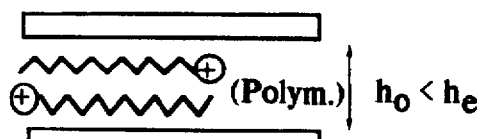
FIGS. 1A to 1D illustrate intercalated claypolymer nanocomposites in which the gallery onium ion on adjacent clay layers link the layers through van der Waals interaction. The polymer in these examples occupy space between the associated onium ions.
Figure 1B:
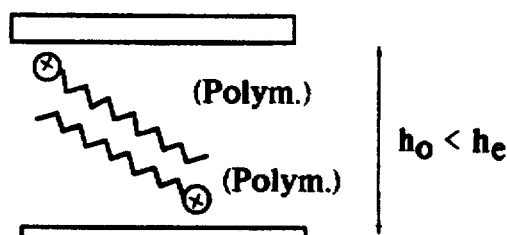
Figure 1C:
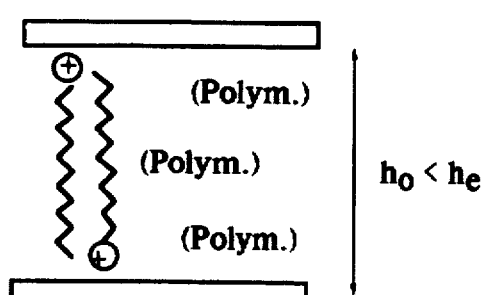
Figure 1D:
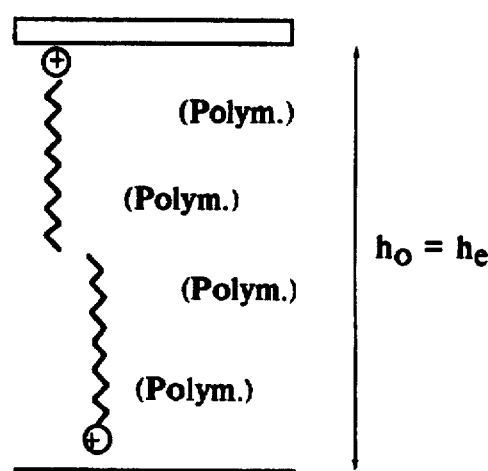
Figure 1E:
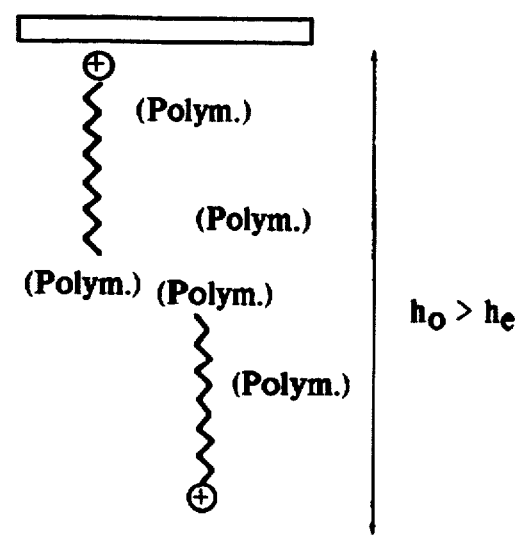
FIG. 1E illustrates an exfoliated claypolymer nanocomposite in which the onium ions on adjacent layers are separated by the guest polymer chains and the clay layers are no longer linked through van der Waals interactions between the onium ions.

The present invention relates to a flexible resin-clay composite composition which comprises: a flexible cured epoxy resin; and organo-clay particles having layers and galleries between the layers, the galleries containing the cured epoxy resin and organic onium cations, wherein the clay particles have a particle size about 0.02 and 2 µm, wherein the ratio by weight of epoxy resin to clay is between about approximately 200:1 and approximately 1:1, wherein the cured epoxy polymer composition has a glass transition temperature (Tg) between about −100° C. and 100° C., and wherein the average separation between the clay layers corresponds to a gallery height of 5 Å to 300 Å.

Further, the present invention relates to a method for the preparation of a flexible resin-clay composite composition which comprises: mixing particles of an organo-clay having layers with galleries between the layers which has been ion exchanged with organic onium cations with a flexible liquid epoxy resin and a curing agent which produces a cured epoxy resin; and curing the liquid epoxy resin with the curing agent to produce the polymer-clay composite composition, wherein the galleries contain the cured epoxy resin, wherein the cured epoxy polymer composition has a glass transition temperature (Tg) between about −100° C. and 100° C., and wherein the average separation between the clay layers corresponds to a gallery height of 5 Å to 300 Å.

Finally, the present invention relates to a method for providing a flexible sealant in an apparatus operated at a particular temperature ($T_o$) the improvement which comprises: providing as the sealant a resin-clay composite composition which comprises: a flexible cured epoxy resin; and clay particles having layers and galleries between the layers, the galleries containing the cured epoxy resin and organic onium cations, wherein the clay particles have a particle size about 0.02 and 2 µm, wherein the ratio by weight of epoxy resin to clay is between about approximately 200:1 and approximately 1:1, wherein the cured epoxy polymer composition has a glass transition temperature (Tg) between about −100° C. and 100° C., and wherein the average separation between the clay layers corresponds to a gallery height of 5 Å to 300 Å.

The clay particles are preferably smectite clays with galleries of about 3 to 30 Å in height before introduction of the epoxy resin. Suitable smectite mineral clays are montmorillonite, hectorite, saponite, nontronite, or beidellite. Suitable synthetic derivatives of smectite clays are fluorohectorite, laponite, taeniolite, tetrasilicic mica or a mixed layer clay mica-montmorillonite. The layers are preferably about 10 Å thick as discussed previously for smectite clays. The particles have a particle size between about 200 and 20,000 Å and a ratio of length to width in a range between about 2,000 to 1 and 20 to 1.

The clay is ion exchanged using ammonium salt, particularly an alkylammonium halide such as a chloride, so that the cation is in the gallery of the clay. The alkyl group preferably contains between 3 and 22 carbon atoms, which can be substituted with various non-carbon groups such as halogen (I, Cl, Br, F), nitrogen, oxygen, sulfur hydroxyl and the like and can be straight chain or branched. Ion exchange is performed as described in Pinnavaia, T. J., ACS Sym. Ser. 499 146 (1992).

The epoxy resins are well known to those skilled in the art and are described in Kirk-Othmer, John Wiley & Sons, 9

267–290 (1980). They are available from a variety of commercial sources including Shell Co., Ciba, and The Dow Chemical.

Bisphenol A type EPON-828 (Shell Co.), is an epoxy resin precursor with the bisphenol A structure and a molecular weight of 380, and has the formula:

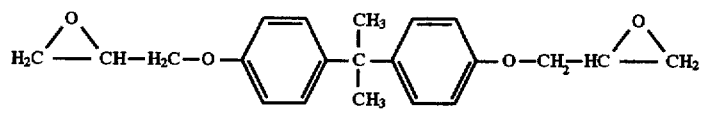

wherein n=0 (88%); n=1 (10%); n=2 (2%).

Bisphenol-A type, DER 331 (Dow Chemical Co., Midland, Mich.), is an epoxy polymer precursor and is an analog to Epon-828 having the formula:

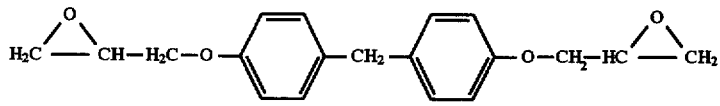

Bisphenol-F type, DER 354 (Dow Chemical Co.) is an epoxy polymer precursor having the formula:

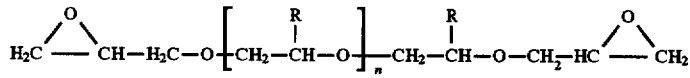

Novolac type, DER 43, DER 438 and DER 439 (Dow Chemical Co.) are epoxy polymer precursors having the formula:

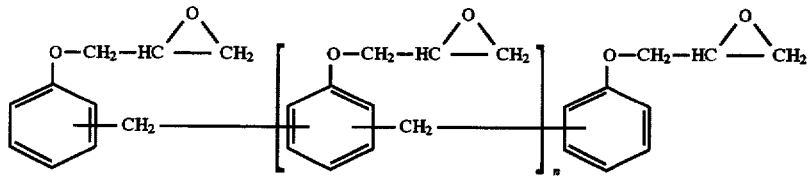

wherein n is between about 0.2 and 1.8.

Epoxy polymer, DER 732 (Dow Chemical Co.) is an epoxy resin precursor of the general formula:

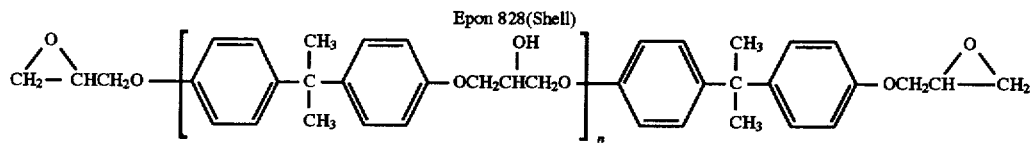

There are numerous other types of epoxy polymer precursors which are suitable and which are well known to those skilled in the art.

Amine curing agents are used to cure the epoxy resin precursors into an epoxy resin. The most preferred curing agents are polyoxypropylene di- or triamines which are sold as JEFFAMINES, Huntsman Chemical Company, Austin, Tex. Most preferred are the polyoxypropylene diamines (D-series) of the formula:

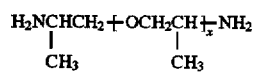

wherein x is between about 4 and 40.

The preferred diamines when used as curing agents for the epoxy resin precursors produce a glass transition temperature of less than ambient temperatures (25° C.) and preferably less than 0° C. As a result, when cured to a pristine epoxy resin without any filler, the resins are flexible when x is between about 4 and 40 in the polyoxypropylene diamine. the cured epoxy resin is also elastic.

The T series JEFFAMINES can be used. These are

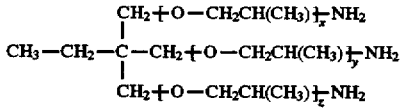

wherein x+y+z between about 4 and 120.

Various other epoxy resin curing agents, such as anhydrides and amides, can be used, so long as they do not interfere with the curing action of the primary ammonium cations in the clay. The amide curing agents are for instance

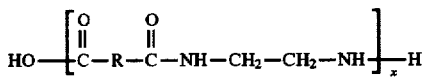

where X is between about 5 and 15.

The organic onium cations in the clay act to catalyze the epoxy resin in situ in the galleries. As a result the clay is intercalated or exfoliated with the cured epoxy resin. The ion-exchanged organic onium cation intercalated clay is mixed with the epoxy resin precursor preferably using shear mixing. Usually the mixture is degassed with a vacuum. The mixture is cured at between about 50° C. to 150° C. depending upon the epoxy resin precursor (monomer or prepolymer) and the curing agent.

When the resin-clay composites of the present invention are flexible, they are very strong in comparison to the pristine epoxy resin. The flexible composites of the present invention are particularly useful as sealants and flexible adhesives. They are strong, exhibiting a relatively high tensile strength. The compositions of the present invention can be used for: surface coatings, particularly decorative coatings; protective coatings; casting and encapsulation; construction, particularly seamless floors, sand-filled flooring, decorative aggregate, polymer concrete, trowel coatings, and wood consolidation; reinforced composites, particularly for propeller and impeller blades, boats, filament-wound tanks and piping; and adhesives. Other uses where a relatively thin flexible layer is needed are for instance in the dampening of interfaces between vibrating surfaces.

The following are illustrative Examples 3 to 28, 30 and 31 showing the use of various clay epoxy polymer precursors, amine and amide curing agents. Examples 1 and 2 are Comparative Examples. Example 29 shows absorption data. Example 32 shows a rigid epoxy-clay polymer composite prepared from meta phenylene diamine as a curing agent.

COMPARATIVE EXAMPLE 1

A pristine epoxy polymer with a sub-ambient glass transition temperature (−40° C.) was prepared by crosslinking Epon-828 epoxy resin (Shell) and JEFFAMINE D2000 (Huntsman Chemicals, Austin, Tex.) polyetheramine curing agent. Equivalent amounts of the epoxide resin (27.5 wt %) and the polyetheramine (72.5 wt %) were mixed at 75° C. for 30 minutes. The epoxide-amine complex was then outgassed in vacuum for 10 minutes and transferred into an aluminum mold for curing at 75° C. for 3 hours and then at 125° C. for an additional 3 hours. The pristine epoxy matrix was named Example 1 (E1). E1 has tensile strength of 0.6 MPa and tensile modulus 2.8 MPa.

JEFFAMINE D2000

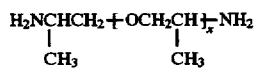

x = 33.1

COMPARATIVE EXAMPLE 2

A conventional clay-epoxy composite (E2) was prepared from naturally occurring Na-montmorillonite from Wyoming. The Na-montmorillonite was purified and the portion of 40–50 μm was used to prepare the composite. Equivalent amounts of the epoxide resin (27.5 wt %) and the polyetheramine (72.5 wt %) were mixed at 75° C./ for 30 minutes. 10 wt % of the clay was added to the epoxide-amine mixture and stirred for another 30 minutes. The clay-epoxide-amine complex was then outgassed in vacuum for 10 minutes and transferred into an aluminum mold for curing at 75° C. for 3 hours and then at 125° C./ for an additional 3 hours. E2 is a phase-segregated composite. Tensile strength and modulus of the composite are 1.2 and 3.5 MPa, respectively. The phase segregation of the clay in the polymer matrix indicates little interaction between the inorganic clay and the polymer matrix. XRD analysis shows that the clay retains its basal spacing after composite formation.

EXAMPLES E3–E8

An improvement of affinity between resin matrix and clay is essential to prepare useful polymer-clay composite. Alkylammonium exchanged clays (organoclays) enhance phase affinity and nanocomposite formation. Examples 3–7 demonstrate the relationship between the chain length of the onium exchange ion and the extent of epoxy resin intercalation (XRD) and the tensile properties of the resin-clay composite. The organoclays were obtained by ion exchange reaction of Na-montmorillonite. The cation exchange reaction was carried out by mixing 500 ml of 0.05M alkylammonium chloride ethanol:water (1:1) solution and 2.0 g of clay at 70°–75° C. for 24 hours. The exchanged clays were washed with ethanol:water (1:1) several times until no chloride was detected with 1.0M $AgNO_3$ solution and then air dried. Finally, the clays were ground and the particle size fraction of 40–50 μm was collected. The hydrophobicity of clay gallery surface of an organoclay is controlled by the chain length of the gallery alkylammonium cations. The extent of epoxy resin intercalation into the clay is dependent on the hydrophobicity of the interlayer gallery regions. Alkylammonium cations with different alkyl chain length (carbon number 4, 8, 10, 12, 16 and 18) were used to prepare organo montmorillonites. Epoxy resin was Epon-828 from Shell Co. Curing agent is JEFFAMINE D2000. Equivalent amounts of the epoxy resin (27.5 wt %) and the polyetheramine (72.5 wt %) were mixed at 75° C. for 30 minutes. 10 wt % of the organoclays was added to the epoxide-amine mixture and stirred for another 30 minutes. The clay-epoxide-amine complex was then outgassed in vacuum for 10 minutes and transferred into an aluminum mold for curing at 75° C. for 3 hours and then at 125° C. for an additional 3 hours. The composite samples were labeled Examples E3, E4, E5, E6, E7, and E8, representing alkylammonium chain length, C4, C8, C10, C12, C16, and C18 respectively. X-ray diffraction results for the epoxy resin-clay composites indicate that the clays with alkyl chain length $\geq 10$ (E5, E6 and E7, and E8) the absence of a $d_{001}$ diffraction. Therefore, C10–C18 chain alkylammonium exchanged montmorillonite clays were exfoliated in the cured epoxy resin matrix. Clay layer separation in sample E5, E6, E7 and E8 was observed from TEM images obtained from ultrathin sections. In comparison, the E3 (C4) and E4 (C8) alkylammonium exchanged montmorillonite clays, exhibited $d_{001}$ X-ray diffraction in the cured composites. Tensile strengths, moduli and clay properties for examples E1, E2, E3, E4, E5, E6, E7 and E8 are listed in Table 1, indicating the mechanical performance was improved significantly with clay exfoliation in the matrix.

TABLE 1

Gallery Chain Length Effect on Nanocomposite Formation and Properties.

| Example | Onium ion, (n)[a] | Initial Clay Gallery Height (Å) | Clay Gallery Height in Composite (Å) | Length of Onium Ion (Å) | Strength (MPa) | Modulus (MPa) |
|---|---|---|---|---|---|---|
| E1 | na | na | na | na | 0.6 | 2.8 |
| E2 | na | na | na | na | 1.2 | 3.5 |
| E3 | 4 | 3.6 | ≧7[b] | 10.0 | 1.3 | 8.1 |
| E4 | 8 | 4.2 | ≧8[b] | 15.1 | 2.9 | 9.0 |
| E5 | 10 | 4.2 | 80–110[c] | 17.6 | 3.2 | 12.2 |
| E6 | 12 | 6.0 | 80–100[c] | 20.2 | 3.5 | 13.8 |
| E7 | 16 | 8.0 | 100–130[c] | 25.3 | 3.6 | 13.9 |
| E8 | 18 | 8.4 | 100–150[c] | 27.8 | 3.6 | 14.5 |

[a]n of gallery ions $(CH_3(CH_2)_{n-1}NH_3^+$;
[b]Obtained from XRD;
[c]Obtained from TEM.
MPa = pascals ÷ 1,000,000.

Figure 4A:
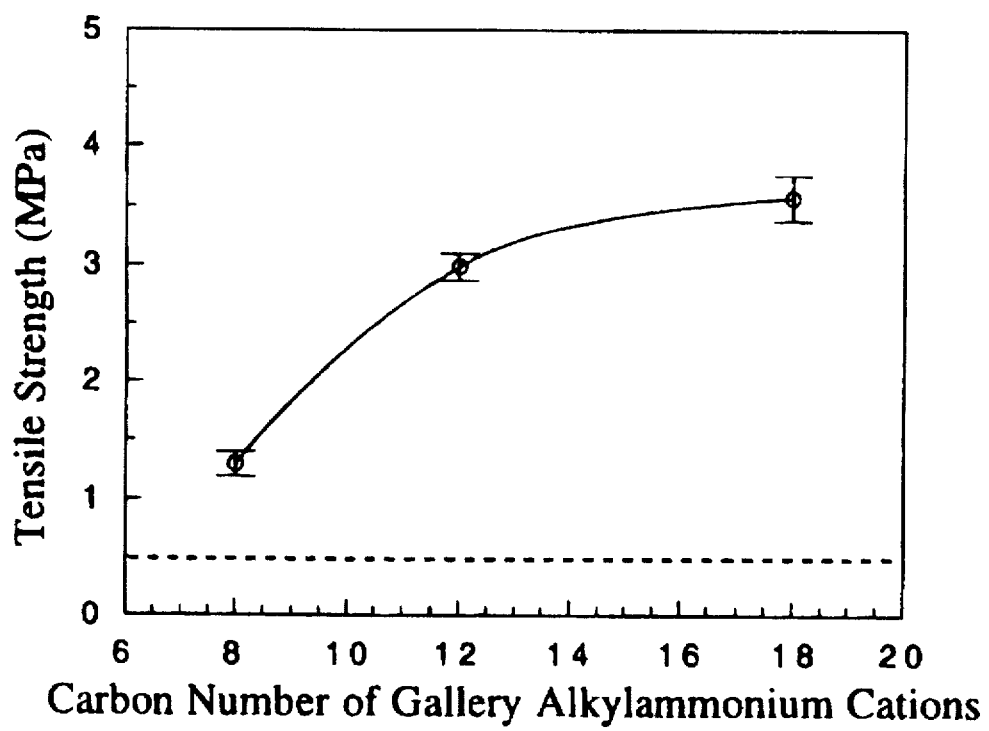
FIGS. 4A and 4B are graphs showing dependence of tensile strength (FIG. 4A) and modulus (FIG. 4B) of epoxy-organo clay composites on the chain length of the clay-intercalated alkylammonium ions. The clay loading in each case was 10 wt %. The dashed lines indicate the tensile strength and modulus of the polymer in the absence of any clay.
Figure 4B:
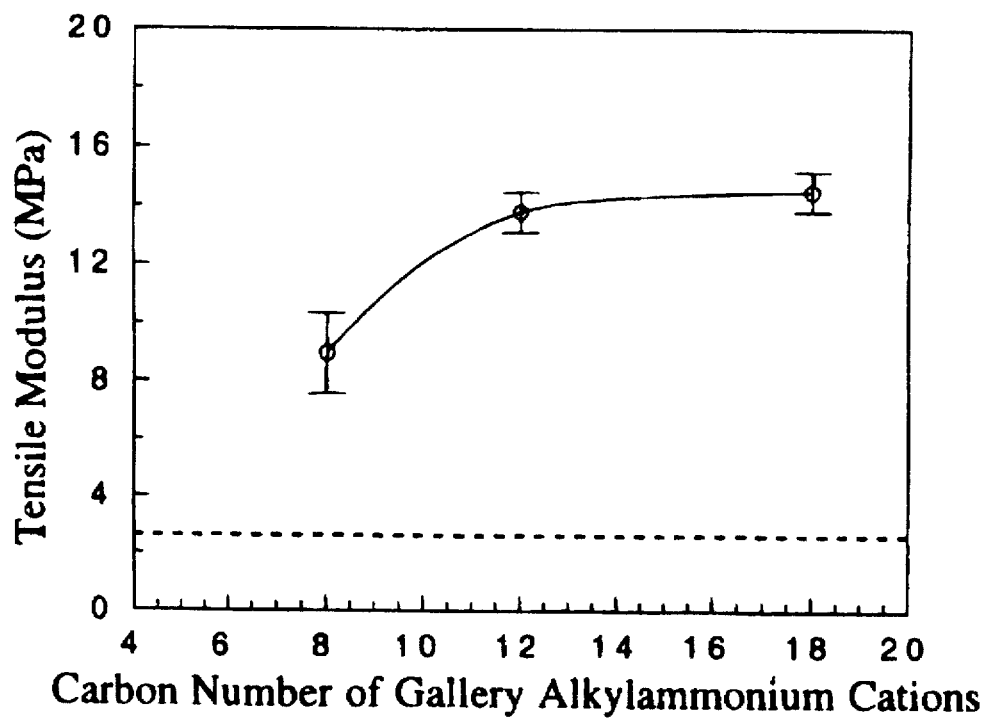

The tensile strengths and moduli of the epoxy resin-clay nanocomposites have been measured according to the ASTM method 3039 using a Universal Test System (UTS). The relationship between the alkylammonium cation chain length of the organoclay and the mechanical properties of the composites is illustrated in FIG. 4 for loadings of 10 wt % $CH_3(CH_2)_{n-1}NH_3^+$-montmorillonite. The presence of the organoclay substantially increases both the tensile strength and the modulus relative to the pristine polymer. The mechanical properties increase with increasing clay exfoliation in the order $CH_3(CH_2)_7NH_3^+$-<$CH_3(CH_2)_{11}NH_3^+$-<$CH_3(CH_2)_{17}NH_3^+$- montmorillonite. It is noteworthy that the strain at break for all of the epoxy resin-clay composites is essentially the same as the pristine matrix, suggesting that the exfoliated clay particles do not disrupt matrix continuity.

Figure 2A:
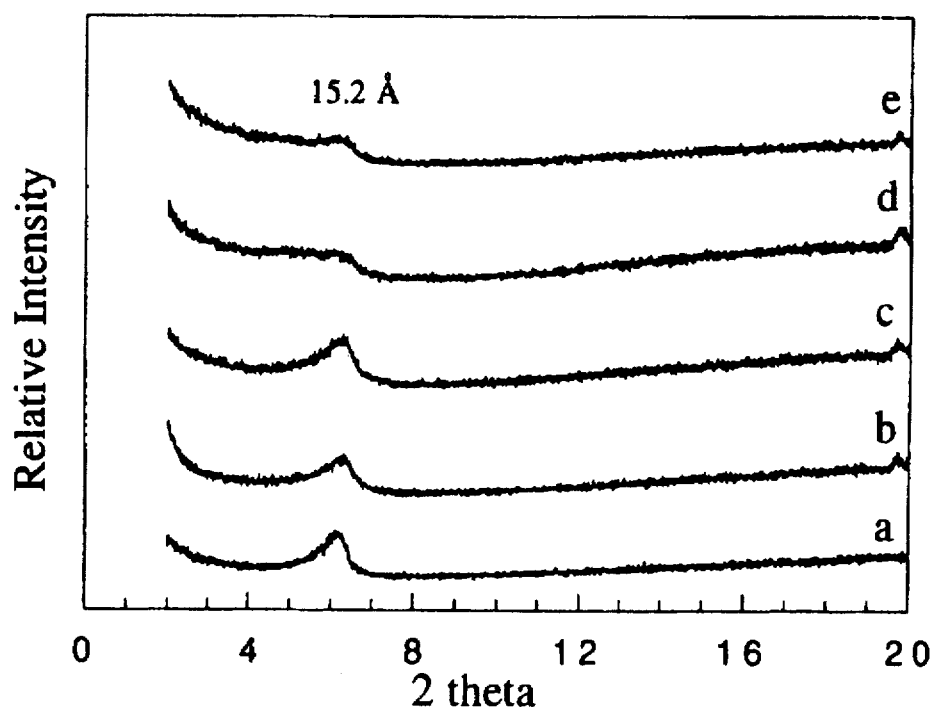
FIGS. 2A and 2B are graphs showing X-ray diffraction patterns of $CH_3(CH_2)_7NH_3^+$-montmorillonite (FIG. 2A) and $CH_3(CH_2)_{17}NH_3^+$-montmorillonite (FIG. 2B) in stoichiometric mixtures of epoxide resin and polyetheramine curing agent after reaction under the following conditions: (a) 75° C., 10 min; (b) 75° C., 1 h; (c) 75° C., 3 h; (d) 75° C., 3 h and 125° C., 1 h; (e) 75° C., 3 h and 125° C., 3 h. The clay loading in each case was 10 wt %. Samples a, b and c in both figures contain intercalated clay particles as indicated by the $d_{001}$ diffraction lines, whereas samples d and e in both figures contain largely exfoliated clay layers.
Figure 2B:
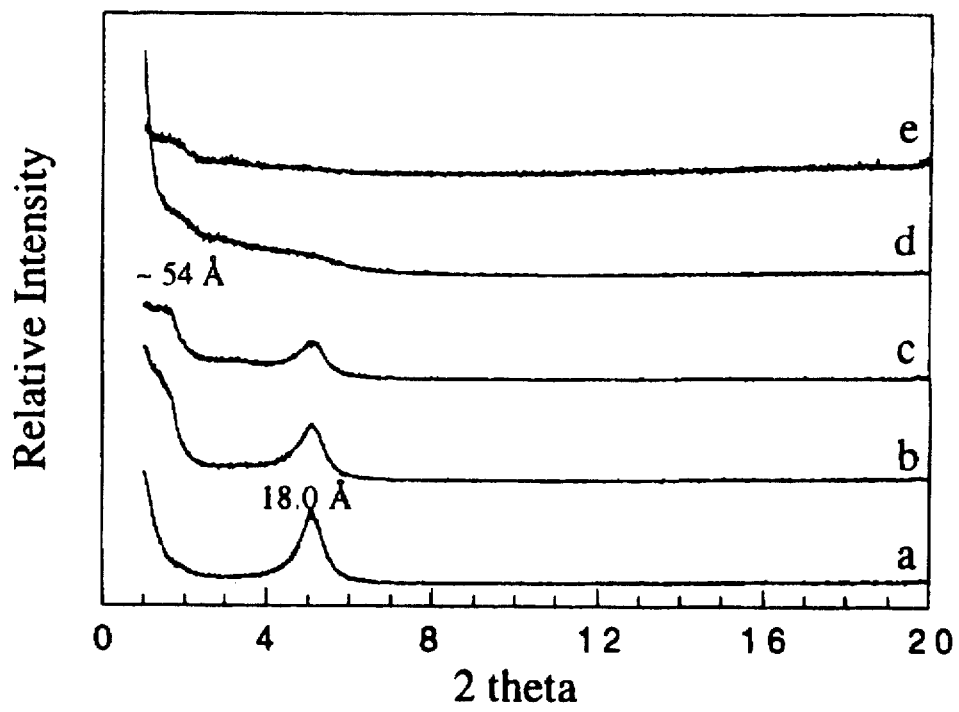

The X-ray diffraction patterns of the epoxy resin-clay composites containing $CH_3(CH_2)_7NH_3^+$—and $CH_3(CH_2)_{17}$-$NH_3^{3O}$ -montmorillonite are shown in FIG. 1A. These diffraction patterns reveal the change in clay basal spacing that occurs in the epoxy curing process. It is noteworthy that $CH_3(CH_2)_7NH_3^+$- and $CH_3(CH_2)_{17}$ $NH_3^+$-montmorillonites respond differently to the epoxide-poly(etheramine) reaction mixture. For $CH_3(CH_2)_7NH_3^+$-montmorillonite (cf. FIG. 2A), the initial basal spacing at 15.2 Å is retained throughout the curing process, but significant broadening and reduction of scattering intensity occur for this reflection at 125° C. For $CH_3(CH_2)_{17}NH_3^+$-montmorillonite (cf. FIG. 2B), the basal spacing increases with reaction time and temperature. A new diffraction line with basal spacing at 54 Å appears after curing at 75° C. for 3 hours, while the intensity of the original clay diffraction line decreases. With further curing at 125° C., the clay diffraction lines are too broad to be distinguishable. Therefore, for $CH_3(CH_2)_{17}NH_3^+$-montmorillonite, an exfoliated nanocomposite is achieved. In contrast, $CH_3(CH_2)_7NH_3^+$-montmorillonite is only partially exfoliated in the polymer matrix.

The formation of exfoliated clay nanocomposites is dependent on the nature of the alkylammonium-exchanged clays. Longer linear alkyl chains facilitate the formation of the nanocomposite. Heating the $CH_3(CH_2)_{17}NH_3^+$-montmorillonite system at 75° C. causes the epoxide and amine to migrate into the clay galleries and form an intermediate with a 54 Å basal spacing. Upon additional heating, further polymerization is catalyzed by the acidic primary ammonium ion (Kamon, T., et al., In Epoxy Resins and Composites LV; Dusek, K., Ed. Springer-Verlag: Berlin; Advances in Polymer Science, 80 177 (1986); Barton, J. M.. Advances in Polymer Science, 72 120 (1985); and May, C. A., Ed. Epoxy Resins, 2nd ed; Marcel Dekker: New York (1988)) and more epoxide and amine enter the galleries, leading to the formation of an exfoliated nanocomposite. Thus, the exfoliation of the clay is caused by intragallery resin formation. In the case of $CH_3(CH_2)_7NH_3^+$-montmorillonite, the hydrophobicity of the galleries is relatively low, and the amount of intercalated epoxide and amine is insufficient to achieve exfoliation. Therefore, only a portion of the clay is delaminated, as evidenced by the broadening and decreased scattering intensity of the 15.2 Å reflection, and the remainder of the clay retains its original basal spacing. Consequently, the final product in the case of $CH_3(CH_2)_7NH_3^+$-montmorillonite is a mixture of exfoliated and conventional clay composites.

Figure 3:
FIG. 3 is a TEM image of an exfoliated epoxy-clay composite containing 20 wt % $CH_3(CH_2)_{17}NH_3^+$-montmorillonite showing the epoxy resin in the layers of the clay.

A typical TEM image of the epoxy-exfoliated clay nanocomposite containing $CH_3(CH_2)_{17}NH_3^+$-montmorillonite is shown in FIG. 3. The dark lines are the cross sections of the 10-Å-thick silicate layers. A face—face layer morphology is retained, but the layers are irregularly separated by ~80–150 Å of resin. This clay particle morphology is correlated with the absence of Bragg X-ray scattering. The TEM images and XRD patterns of the epoxy composite formed with $CH_3^1$ $(CH_2)_{11}$-$NH_3^+$-montmorillonite were essentially the same as those for the $CH_3(CH_2)_{17}NH_3^+$-montmorillonite system.

Figure 5A:
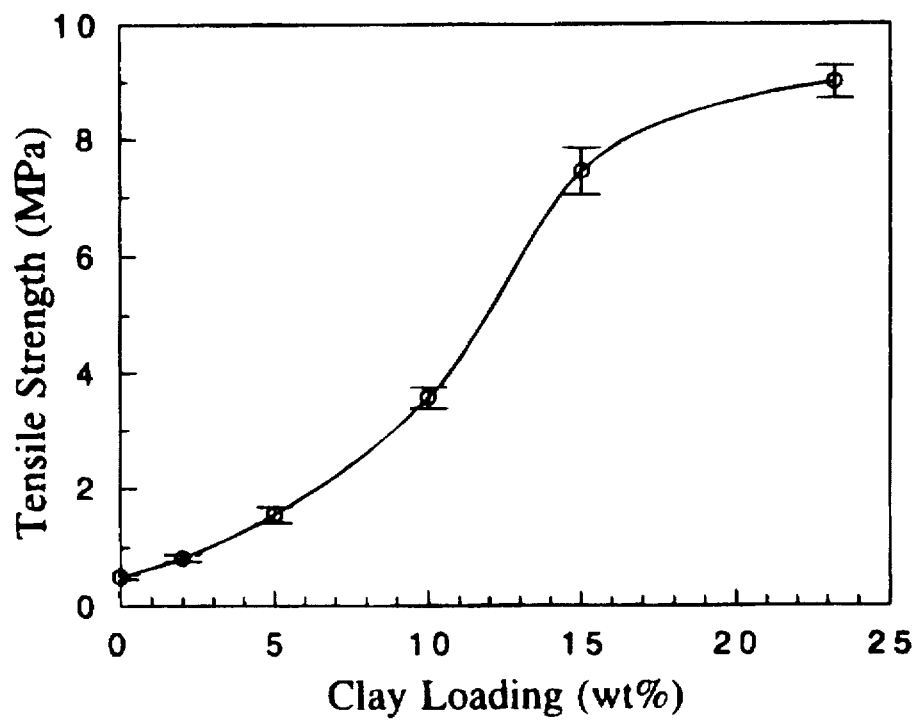
FIGS. 5A and 5B are graphs showing dependence of tensile strength (FIG. 5A) and modulus (FIG. 5B) on clay loading for exfoliated epoxy-$CH_3(CH_2)_{17}NH_3^+$-montmorillonite nanocomposites.
Figure 5B:
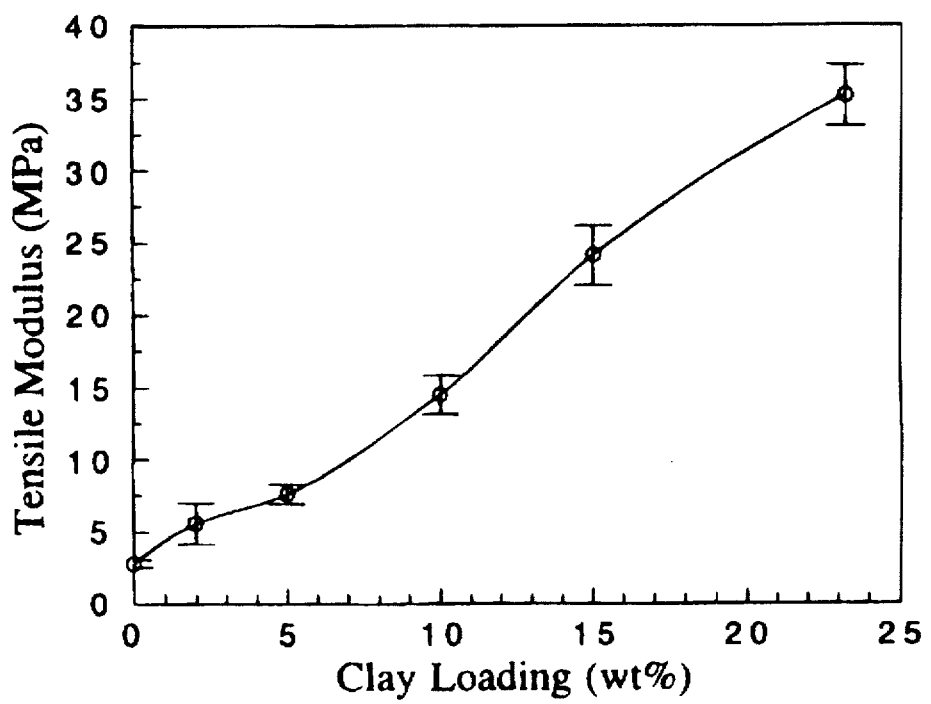

Reinforcement of the epoxy-clay nanocomposites also is dependent on clay loading. As shown in FIG. 5A and 5B, the tensile strength and modulus for the $CH_3(CH_2)_{17}NH_3^+$-montmorillonite system increases nearly linearly with clay loading. More than a 10-fold increase in strength and modulus is realized by the addition of only 15 wt % (~7.5 vol %) of the exfoliated organoclay.

For the low-$T_g$ epoxide-amine system of the present invention, the reinforcement provided by the exfoliated clay is much more significant. Owing to the increased elasticity of the matrix above the $T_g$, the improvement in reinforcement may be due in large part to shear deformation and stress transfer to the platelet particles. In addition, platelet alignment under strain may also contribute to the improved performance of clays exfoliated in a rubbery matrix as compared to a glassy matrix. The most significant difference between glassy and rubbery resins is the elongation upon stress. The rubbery epoxy matrix used in these Examples exhibits 40–60% elongation at break, whereas for the glassy epoxy resin matrix it was reported previously that it was only 5–8%.

Figure 6A:
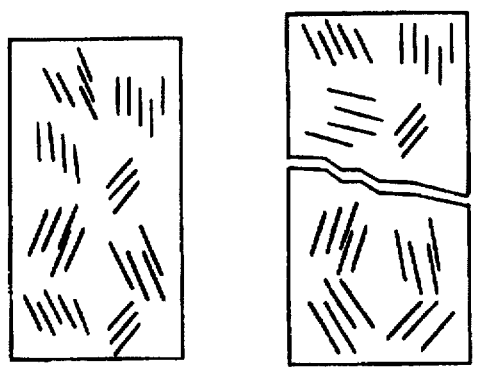
FIGS. 6A and 6B are models for the fracture of a glassy (FIG. 6A) and a rubbery polymer-clay (FIG. 6B) exfoliated nanocomposite with increasing strains.
Figure 6B:
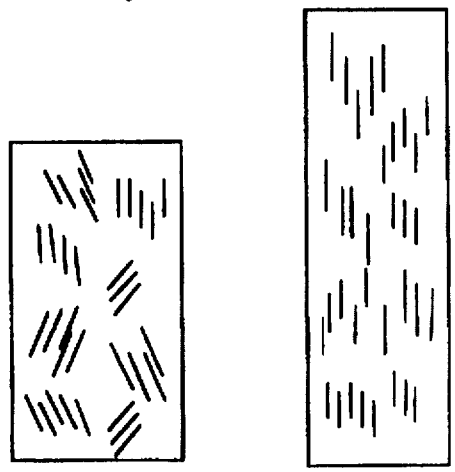

As illustrated in FIGS. 6A and 6B, the clay platelets in the cured resin are capable of being aligned in the direction of the matrix surface. When strain is applied in the direction parallel to the surface, the clay layers are aligned further. This strain-induced alignment of the layers enhance the ability of the particles to function as the fibers in fiber-reinforced plastics. Propagation of fracture across the resin matrix containing aligned silicate layers is energy consuming, and the tensile strength and modulus are reinforced. In a glassy matrix, clay particle alignment upon applied strain is minimal and blocking of the fracture by the exfoliated clay is less efficient.

EXAMPLES E9–E13

Examples 9–13 illustrate the relationship between clay charge density, the degree of resin intercalation and tensile properties of composites formed from different 2:1 clays having the same gallery onium ions, namely $CH_3(CH_2)$ $_{17}$NH$_3^+$. Clay layer charge density is an important factor in determining the clay exfoliation in the polymer matrix. Several smectite clays such as hectorite (Hect), montmorillonite (Wyoming and Arizona), and fluorohectorite (Fhect) were used to prepare epoxy-clay composites. For comparison, non-smectite 2:1 clays such as vermiculite (Verm) and rectorite (Rect) also were used to prepare epoxy resin-clay composites. The preparation method is essentially the same as described in Example E3–E8. C18 alkylammonium cation was used as gallery ions. The composite samples were labeled E9, E10, E11, E12, and E13 for composites containing hectorite, montmorillonite from Arizona, fluorohectorite, rectorite, and vermiculite, respectively. Clay gallery heights, clay layer density and tensile properties are listed in Table 2. The Example E12 contains rectorite, a regularly interstratified clay unlike normal smectite clays has a layer thickness of 20 Å rather than 10 521. Thus, the exfoliation of rectorite in epoxy matrix provides 20 Å-thick silicate layers dispersed uniformly in the matrix. Natural rectorite was purified and ion-exchanged to CH$_3$(CH$_2$)$_{17}$MH$_3^+$-rectorite. Comparing E12 and E8, it was noticed that at the same clay loading, rectorite composite has a comparable strength and modulus as montmorillonite composite, even though the number of clay layers in the rectorite composite is nearly half of those montmorillonite composite. Therefore, the 20 Å-thick rectorite clay layers are more effective than the 10 Å-thick clay layer as reinforcement particle in a flexible matrix.

TABLE 2

Composite Formation and Properties with Different Layer Charge Density Clays (E8–E13), clay loading is 10 wt %.

| Ex. | Clay | Layer charge density (e$^-$/ O$_{20}$(OH)$_4$) | Initial Clay Gallery Height (Å) | Clay Gallery Height in Composite (Å) | Strength (MPa) | Modulus (MPa) |
|---|---|---|---|---|---|---|
| E8 | Mont-Wy | 0.76 | 24.5$^a$ | 80–110$^b$ | 3.6 | 14.5 |
| E9 | Hect | 0.66 | 25.7$^a$ | 80–110$^b$ | 3.0 | 14.5 |
| E10 | Mont-Az | 1.2 | 25.0$^a$ | 80–110$^b$ | 3.7 | 14.0 |
| E11 | Fhect | 1.4 | 24.1$^a$ | 95$^{a,b}$ | 2.5 | 15.1 |
| E12 | Rect | 0.7 | 25.1$^a$ | 80–120$^b$ | 3.2 | 13.1 |
| E13 | Verm | 1.6 | 25.3$^a$ | 45$^a$ | 1.8 | 9.0 |

$^a$Obtained from XRD;
$^b$Obtained from TEM.

EXAMPLES E14–E17

These examples show the dependence of clay reinforcement on clay loading. Epoxy resin-clay nanocomposites were prepared according to the preparation method described in the E3–E8 with different clay loadings prepared. The examples with clay contents of 2, 5, 15 and 23 wt % were labeled E14, E15, E16 and E17, respectively. X-ray diffraction results indicate that they are exfoliated clay nanocomposites. Tensile properties of the examples, along with the reference epoxy resin from Example 1 are given in FIG. 5A and 5B.

The results in FIG. 5A and 5B clearly show the reinforcing effect of the exfoliated clay layers in the resin matrix. Similar results also were observed for exfoliated clay nanocomposites containing other smectite clays.

EXAMPLES E18–E21

These examples demonstrate the relationship between layer separation and tensile properties of resin-clay nanocomposites. Exfoliated epoxy-clay nanocomposites were prepared by using in situ gallery intragallery catalyzed polymerization. Intercalated nanocomposites were also prepared without intragallery catalyzed polymerization. The gallery cation acidity plays a very important role in determining the intragallery epoxy-amine polymerization rates and in controlling the clay exfoliation in the epoxy-amine thermosetting process. Quaternary alkylammonium ion such as CH$_3$(CH$_2$)$_{17}$N(CH$_3$)$_3^+$ ($^C$183M) was used to prepare organoclays. X-ray diffraction results indicated that the composites have distinct d$_{001}$ diffraction at 42 Å, corresponding to a 32 Å gallery height. Therefore, they are typical intercalated nanocomposites. The examples are labeled E18, E19, E20, and E21 for the composites containing CH$_3$(CH$_2$)$_{17}$N(CH$_3$)$_3^+$-montmorillonite at 2, 5, 10 and 15 wt % clay loading. Tensile properties of the intercalated nanocomposites are listed in Table 3. For comparison, the exfoliated nanocomposites prepared with similar chain length primary alkylammonium exchanged clays (E8, E14–16) are listed as well.

TABLE 3

Comparison of Tensile Properties of Intercalated and Exfoliated Epoxy-Montmorillonite Clay Nanocomposites.

| Sample | Gallery Onium Ions | Initial Clay Gallery Height (Å)$^a$ | Clay Gallery Height in Composite(Å) | Composite Type | Clay Loading (wt %) | Tensile Strength (MPa) | Tensile Modulus (MPa) |
|---|---|---|---|---|---|---|---|
| E18 | Q | 12.5 | 32.0$^a$ | intercalated | 2 | 1.3 | 6.5 |
| E14 | P | 8.4 | 100–220$^b$ | exfoliated | 2 | 0.9 | 5.9 |
| E19 | Q | 12.5 | 32.0$^a$ | intercalated | 5 | 1.7 | 6.9 |
| E15 | P | 8.4 | 80–160$^b$ | exfoliated | 5 | 1.6 | 7.6 |
| E20 | Q | 12.5 | 32.0$^a$ | intercalated | 10 | 2.6 | 12.4 |
| E8 | P | 8.4 | 80–110$^b$ | exfoliated | 10 | 3.6 | 14.5 |
| E21 | Q | 12.5 | 32.0$^a$ | intercalated | 15 | 3.0 | 15.2 |
| E16 | P | 8.4 | 80–110$^b$ | exfoliated | 15 | 7.4 | 24.1 |

TABLE 3-continued

Comparison of Tensile Properties of Intercalated and Exfoliated Epoxy-Montmorillonite Clay Nanocomposites.

| Sample | Gallery Onium Ions | Initial Clay Gallery Height (Å)[a] | Clay Gallery Height in Composite(Å) | Composite Type | Clay Loading (wt %) | Tensile Strength (MPa) | Tensile Modulus (MPa) |
|---|---|---|---|---|---|---|---|

P: Primary ammonium ion $CH_3(CH_2)_{17}NH_3+$; Q: Quaternary ammonium ion $CH_3(CH_2)_{17}N(CH_3)_3+$; [a]Obtained from XRD; [b]Obtained from TEM.

The mechanical property data in Table 3 demonstrate that the reinforcing effect for intercalated and exfoliated nanocomposites are comparable at low clay loading up to 5 wt % and similar in magnitude to the pristine resin. However, at higher clay loadings in the range 10 and 15 wt %, the reinforcing effect for the exfoliated nanocomposites is much larger than the intercalated nanocomposites. Thus, at clay loading above about 5 wt %, the extent of clay layer separation determines the performance properties of the epoxy resin-clay nanocomposites. Similar effects were observed for fluorohectorite and other 2:1 clay systems.

EXAMPLES 22–24

These examples demonstrate the relationships between reinforcement properties and the extent of clay layer exfoliation. $CH_3(CH_2)_3NH_3^+$, $CH_3(CH_2)_7NH_3^+$, and $CH_3(CH_2)_{17}NH_3^+$ exchanged montmorillonites are used to prepare epoxy resin-clay nanocomposites. The epoxy resin and curing agent are identical to the composition described in Examples 3, 4 and 8. The curing condition is modified to hot-mold-casting, which means that transfer of the degassed epoxy-clay composition to a preheated- (125° C.) mold and continuance of the curing at 125° C. for 6h. The hot-mold-casting method promote the intercalation of the epoxy monomer to the clay galleries in the clay and clay exfoliation, especially for the shorter chain alkylammonium exchanged clays. In Table 4, epoxy-clay composites prepared by the hot-mold-casting method are compared with the ones with the same composition but prepared by the conventional casting method.

TABLE 4

Comparison of Tensile Properties of Epoxy-clay Composites Containing Alkylammonium Exchanged Montmorillonite (10 wt %) Prepared under Different Curing Conditions.

| Ex. | Onium ion, (n)[a] | Curing Condition | Initial Clay Gallery Height (Å) | Clay Gallery Height in Composite (Å) | Strength (MPa) | Modulus (MPa) |
|---|---|---|---|---|---|---|
| E1 | None | CC | — | — | 0.6 | 2.8 |
| E3 | 4 | CC | 3.6 | ≧7[b] | 1.3 | 8.1 |
| E22 | 4 | HMC | 3.6 | ≧10 | 2.1 | 12 |
| E4 | 8 | CC | 4.2 | ≧8[b] | 2.9 | 9.0 |
| E23 | 8 | HMC | 4.2 | ≧100[c] | 4.7 | 16 |
| E8 | 18 | CC | 8.4 | 100–150[c] | 3.6 | 14.5 |
| E24 | 18 | HMC | 8.4 | 100–150[c] | 3.8 | 14.6 |

[a]n of gallery ions $CH_3(CH_2)_{n-1}NH_3^+$;
[b]Obtained from XRD;
[c]Obtained from TEM.
CC: Conventional casting;
HMC: hot-mold-casting.

Tensile properties of these composites are compared in Table 4. For the composites containing $CH_3(CH_2)_3NH_3^+$-, as well as $CH_3(CH_2)_7NH_3^+$-montmorillonite, a great improvement in mechanical properties is achieved by using the hot-mold-casting method. However, for the composite containing $CH_3(CH_2)_{17}NH_3^+$-montmorillonite, which is easily exfoliated under both normal and hot-mold-casting conditions, no further mechanical improvement is observed.

EXAMPLES E25–E28

Epoxy-clay nanocomposites were prepared by using other epoxy resins from DOW Chemical Co. and JEFFAMINE D2000 containing $CH_3(CH_2)_{17}NH_3^+$-montmorillonite. The basic structures of the DOW epoxy resin are given as follows:

E25: Bisphenol-A type, DER 331, Analogs to Epon 828.

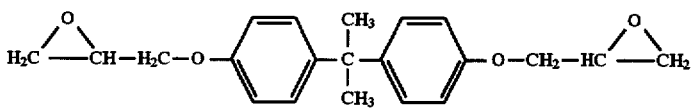

E26: Bisphenol-F type, DER 354.

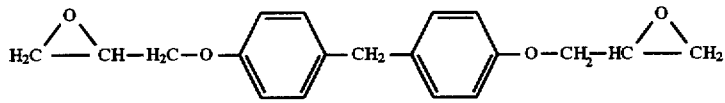

E27: Novolac type, DEN 438.

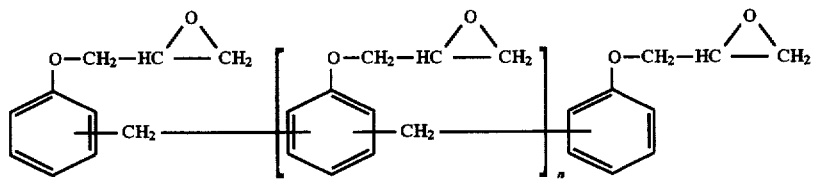

E28: Flexible epoxy resin, DER 732.

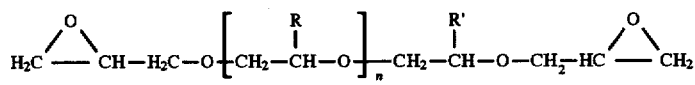

The epoxy-clay nanocomposites prepared from above-mentioned epoxy resin with 10 wt % $CH_3(CH_2)_{17}NH_3^+$-montmorillonite have exfoliated structures. Their mechanical properties compared to those of the pristine resin matrices are superior and comparable to the results obtained from Epon 828–D2000 systems of Examples 1 to 24.

EXAMPLE 29

Solvent adsorption experiments for Examples E1, E2, E3 and E8.

Solvent absorption data were obtained using a mass differential technique. Samples of a known weight were immersed in toluene at room temperature and reweighed periodically after blotting to remove excess solvent. The difference between two weighings corresponded to toluene uptake. Samples were weighted until constant weight at which point it was assumed that they had reached equilibrium. The relative rate of toluene adsorption and total uptake at equilibrium of Examples E1, E2, E3 and E8 are listed in Table 5.

TABLE 5

Relative Toluene Adsorption Rate and Total Uptake of Epoxy-Clay Nanocomposites.

| Nanocomposites Example | Type of Clay Composite | Relative Initial Adsorption Rate (%) | Relative Total Uptake (%) |
|---|---|---|---|
| E1 | na | 100 | 100 |
| E2 | conventional | 95 | 100 |
| E3 | intercalated | 84 | 93 |
| E8 | exfoliated | 42 | 51 |

The toluene adsorption results exhibit a substantial decrease in solvent uptake for the exfoliated epoxy-clay nanocomposite E8. The exfoliated 10 Å-thick clay layer in the matrix may contribute to the decrease of the rate and amount of the solvent uptake. Whereas, for the intercalated nanocomposite and the conventional composite, the clay exists as tactoids, the effect of clay in decreasing solvent adsorption is not significant. Similar experiments with hexane adsorption were carried out and comparable results were obtained.

The adsorbed organic molecules can be removed by air-drying or vacuum-drying. During the drying process, the pristine polymer matrix (E1), conventional composite (E2), and intercalated nanocomposite (E3) crack, whereas, the exfoliated nanocomposite (E8) retains its integrity. Therefore, for the exfoliated nanocomposite, the adsorption-desorption of organic molecules occurs with structural reversibility. The ability of the nanocomposite to return to its pristine structural state upon desorption of dissolved organic solvent greatly extends their use as sealants and gaskets which may contact organic substances frequently.

EXAMPLE 30

Exfoliated epoxy-clay nanocomposites can also be obtained by replacing the D2000 curing agent in Examples E8, E9, E10, E11, and E12 with glyceryl poly(oxypropylene)triamine curing agents of the type

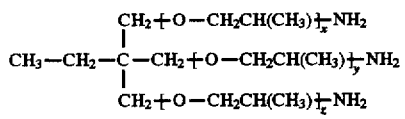

and x+y+z=4–120. These curing agents are commercially available under the trademark JEFFAMINE 403, T703, T3000 and T5000.

EXAMPLE 31

The curing of epoxy resin is not limited to amine curing agent. Replacement of the amine curing agents in Examples E8, E9, E10, E11 and E12 with polyamide of the type

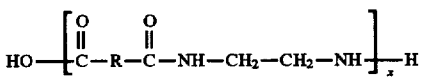

and x=5–15, also affords nanocomposite materials with greatly improved mechanical properties. These polyamide curing agents are commercially available under the tradename VERSAMID 140, 125 and 100, available from Henkel, Ambler, Pa.

EXAMPLE 32

Comparative epoxy resin-exfoliated clay nanocomposites formed from Epon-828 resin and m-phenylenediamine as the curing agent were prepared using long-chain alkylammonium-exchanged smectite clays. Due to the high glass transition temperature (~150° C.) of the epoxy matrix, the composites were in a glassy state at room temperature. The results are shown in Table 6.

TABLE 6

Mechanical Properties of Epoxy-Clay Nanocomposites formed with $CH_3(CH_2)_{14}NH_3^+$ Clays

| Clay Samples (1 wt %) | Failure Strength (MPa) | Tensile Modulus (GPa) |
|---|---|---|
| Laponite | 83 ± 2 | 1.59 ± 0.04 |
| Hectorite | 94 ± 2 | 1.65 ± 0.03 |
| Montmorillonite | 92 ± 5 | 1.49 ± 0.03 |
| Fluorohectorite | 73 ± 3 | 1.55 ± 0.06 |

Figure 7:
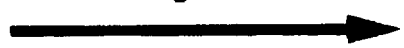
FIG. 7 is a graph showing the effect of alkylammonium ion chain length on the mechanical properties of epoxy-montmorillonite composites (2 wt %) using metaphenylene diamine as a curing agent to form a rigid polymer-clay composite.
Figure 7:
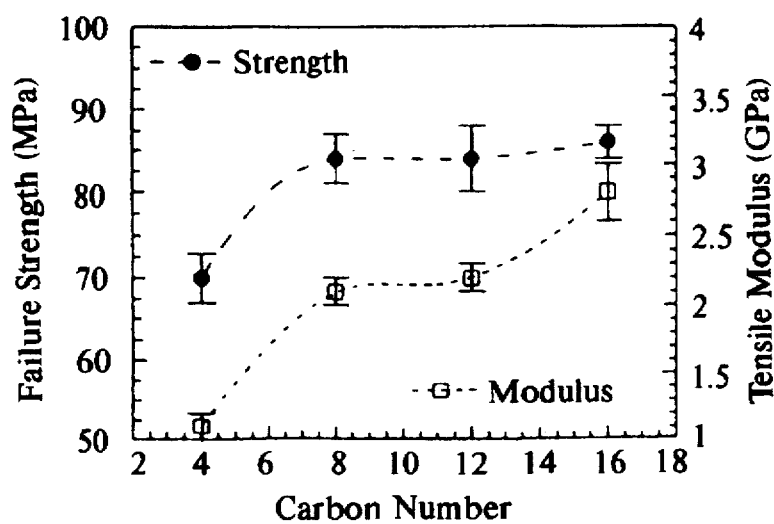

It was found that the improvement over the admixtures with the clay were not as pronounced as with the polyoxypropylene diamines. This can be seen from FIG. 7.

The inventors described this Example 32 in publications by Lan et al, Proceedings of the ACS, PMSE 71 527-528 (published August 1994) and Lan et al, Chemistry of Materials 6 2216–2219 (December 1994). A derivative work based on the inventors' work was published in Chemical Materials 6 1719–1725 (December 1994).

It is intended that the foregoing description be only illustrative of the present invention and that the present invention be limited only by the hereinafter appended claims.

We claim:

1. In a method for providing a flexible sealant in an apparatus the improvement which comprises: providing as the sealant a resin-clay composite composition which comprises:

(a) a cured epoxy resin; and
   (b) a smectite clay having layers with the cured epoxy resin separating the layers, the galleries containing the cured epoxy resin and organic onium cations wherein the onium cations are protonated unsubstituted alkyl ammonium cations containing 3 to 22 carbon atoms in the alkyl ammonium cations, wherein the composition contains between about 5 and 50 weight percent of the clay, and wherein the average separation between the clay layers corresponds to a gallery height of 7 Å to 300 Å.

2. The composition of claim 1 wherein an epoxy resin precursor is cured with a diamine as the curing agent to provide the cured epoxy resin.

3. The method claim 1 wherein a diglycidyl ether of bisphenol A monomer is cured with a polyoxypropylene diamine as the curing agent to provide the cured epoxy resin.

4. The method of claim 1 wherein a Novolac epoxy prepolymer is cured with a polyoxypropylene diamine to provide the cured epoxy resin.

5. The method of claim 1 wherein a diglycidyl ether of bisphenol F monomer is cured with a polyoxypropylene diamine to provide the cured epoxy resin.

6. The method of claim 1 wherein a diglycidyl polyalkylene ether epoxy prepolymer is cured with a polyoxypropylene diamine to provide the cured epoxy resin.

7. The method of claim 1 wherein an epoxy monomer or prepolymer is cured with a polyoxypropylene diamine having a formula:

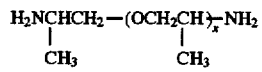

wherein x is between about 4 and 40 as the curing agent to provide the cured epoxy resin.

8. The method of claim 1 wherein the epoxy resin is a diglycidyl ether of bisphenol A monomer cured with a polyoxypropylene diamine having a formula:

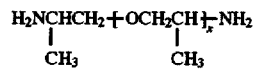

wherein x is between about 4 and 40 as the curing agent to provide the cured epoxy resin.

9. The method of claim 1 wherein the epoxy resin is derived from a diglycidyl ether of bisphenol F monomer cured with a polyoxypropylene diamine having a formula:

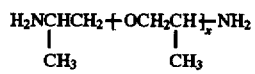

wherein x is between about 4 and 40.

10. The method of claim 1 wherein the epoxy resin is derived from a Novolac polymer cured with a polyoxypropylene diamine having a formula:

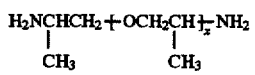

wherein x is between about 4 and 40.

11. The method of claim 1 wherein the epoxy resin is a diglycidyl polyalkylene ether epoxy resin cured with a polyoxypropylene diamine having a formula:

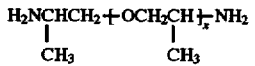

wherein x is between about 4 and 40.

12. The method of claim 1 wherein the clay is selected from the group consisting of smectite clay minerals, montmorillonite, hectorite, saponite, nontronite or beidellite, and synthetic derivatives, fluorohectorite, laponite, taeniolite or tetrasilicic mica.

13. The method of claim 1 wherein the clay is a synthetic mixed layer clay mica-montmorillonite.

* * * * *